United States Patent
Kim et al.

(10) Patent No.: US 9,256,471 B2
(45) Date of Patent: Feb. 9, 2016

(54) TASK SCHEDULING METHOD FOR PRIORITY-BASED REAL-TIME OPERATING SYSTEM IN MULTICORE ENVIRONMENT

(71) Applicant: ELECTRONICS AND TELECOMMUNICATIONS RESEARCH INSTITUTE, Daejeon (KR)

(72) Inventors: Sangcheol Kim, Gyeongsang-si (KR); Seontae Kim, Daejeon (KR); Pyeongsoo Mah, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/461,791

(22) Filed: Aug. 18, 2014

(65) Prior Publication Data
US 2015/0106819 A1 Apr. 16, 2015

(30) Foreign Application Priority Data
Oct. 14, 2013 (KR) .................. 10-2013-0122057

(51) Int. Cl.
*G06F 9/46* (2006.01)
*G06F 9/50* (2006.01)
*G06F 9/48* (2006.01)

(52) U.S. Cl.
CPC ............ *G06F 9/5038* (2013.01); *G06F 9/4881* (2013.01)

(58) Field of Classification Search
CPC .................................................. G06F 9/4881
USPC ................................................ 718/102, 103
See application file for complete search history.

(56) References Cited

U.S. PATENT DOCUMENTS

| 7,266,750 B1* | 9/2007 | Patapoutian ...... H03M 13/1105 714/758 |
| 2007/0220517 A1 | 9/2007 | Lippett |
| 2008/0148076 A1* | 6/2008 | Gabor .................. G06F 1/3203 713/300 |

(Continued)

FOREIGN PATENT DOCUMENTS

| KR | 10-2007-0037427 A | 4/2007 |
| KR | 10-2013-0059300 A | 6/2013 |

(Continued)

OTHER PUBLICATIONS

Anderson et al., "Real-Time Scheduling on Multicore Platforms", 2005.*

(Continued)

*Primary Examiner* — Phillip H Nguyen
(74) *Attorney, Agent, or Firm* — Rabin & Berdo, P.C.

(57) ABSTRACT

Disclosed herein is a task scheduling method for a priority-based real-time operating system in a multicore environment, which solves problems occurring in real-time multicore task scheduling which employs a conventional decentralized scheme. In the task scheduling method, one or more scheduling algorithm candidates for sequential tasks are combined with one or more scheduling algorithm candidates for parallel tasks. Respective task scheduling algorithm candidates generated at combining, are simulated and performances of the candidates are evaluated based on performance evaluation criteria. A task scheduling algorithm exhibiting best performance is selected from among results obtained at evaluating the performances.

8 Claims, 14 Drawing Sheets

(56) References Cited

U.S. PATENT DOCUMENTS

| | | |
|---|---|---|
| 2009/0116504 A1 | 5/2009 | Hahm et al. |
| 2010/0070958 A1* | 3/2010 | Takagi .................... G06F 8/456 717/149 |
| 2013/0139176 A1 | 5/2013 | Kang |
| 2013/0167152 A1 | 6/2013 | Jeong |
| 2013/0198758 A1 | 8/2013 | Lim et al. |
| 2014/0033159 A1* | 1/2014 | Hui ...................... G06F 17/5068 716/132 |

FOREIGN PATENT DOCUMENTS

| | | |
|---|---|---|
| KR | 10-2013-0074401 A | 7/2013 |
| KR | 10-2013-0088513 A | 8/2013 |

OTHER PUBLICATIONS

Calandrino et al., "A Hybrid Real-Time Scheduling Approach for Large-Scale Multicore Platforms", 2007.*

* cited by examiner

|    | PRIORITY | EXECUTION TIME |
|----|----------|----------------|
| T1 | 6        | 10             |
| T2 | 5        | 20             |
| T3 | 4        | 30             |
| T4 | 3        | 40             |
| T5 | 2        | 50             |
| T6 | 1        | 60             |

FIG. 4

| TASK (no) | TYPE | PRIORITY | SIZE | # OF EXEC | PERIOD |
|---|---|---|---|---|---|
| 1 | SEQ | 62 | 3 | 40 | 100 |
| 2 | SEQ | 60 | 5 | 25 | 130 |
| 3 | SEQ | 58 | 8 | 15 | 180 |
| 4 | SEQ | 56 | 10 | 10 | 110 |
| 5 | SEQ | 54 | 15 | 10 | 210 |
| 6 | SEQ | 32 | 10 | 1 | - |
| 7 | SEQ | 32 | 10 | 1 | - |
| 8 | SEQ | 32 | 10 | 1 | - |
| 9 | SEQ | 30 | 10 | 1 | - |
| 10 | SEQ | 28 | 20 | 1 | - |
| 11 | SEQ | 26 | 30 | 1 | - |
| 12 | SEQ | 24 | 50 | 1 | - |
| 13 | SEQ | 22 | 100 | 1 | - |
| 14 | SEQ | 20 | 200 | 1 | - |

| TASK (no) | SUBTASK (no) | TYPE | PRIORITY | SIZE | # OF EXEC |
|---|---|---|---|---|---|
| 15 | 1 | HPC | 20 | 50 | |
| | 2 | HPC | 20 | 90 | 1 |
| | 3 | HPC | 20 | 20 | |
| 16 | 1 | HPC | 20 | 30 | |
| | 2 | HPC | 20 | 80 | |
| | 3 | HPC | 20 | 20 | 1 |
| | 4 | HPC | 20 | 20 | |
| | 5 | HPC | 20 | 20 | |
| 17 | 1 | HPC | 10 | 50 | |
| | 2 | HPC | 10 | 80 | |
| | 3 | HPC | 10 | 90 | |
| | 4 | HPC | 10 | 20 | |
| | 5 | HPC | 10 | 30 | 1 |
| | 6 | HPC | 10 | 50 | |
| | 7 | HPC | 10 | 60 | |
| | 8 | HPC | 10 | 100 | |
| | 9 | HPC | 10 | 20 | |
| | 10 | HPC | 10 | 20 | |

FIG. 7

```
Algorithm L1_Scheduler(T_i ∈ A, S), where T_i is an arrived task
    switch (type of T_i)
    {
        case SEQ task :
            C_i = CoreSelectSEQ(T_i)
            submit T_i to L2 scheduler of core C_i case HPC task :
            CoreSelectHPC(T_i)
    }

Algorithm CoreSlectHPC(T_i ∈ A): (X-Y), where X is one of (MIN-or
MAX-) and Y is a scheduling algorithem of SEQ task
    while (T_i ≠ ∅) do
    {
        if (X is MIN-)
            select a subtask t_k^i ∈ T_i with the smallest τ
        if (X is MAX-)
            select a subtask t_k^i ∈ T_i with the largest τ
        C_i = CoreSelectSEQ(t_k^i) for Y
        submit t_k^i to L2_scheduler of core C_i
        T_i = T_i - {t_k^i}
    }
```

FIG. 8

| RANK | ALGORITHM SORTED BY AVERAGE RANK | MAKESPAN (improvement(%)) | PRIOINV (improvement(%)) | AVERAGE (improvement(%)) |
|---|---|---|---|---|
| 1 | NTWP/MIN-MNT | 1051.88 (4.80) | 9.3125 (30.37) | 17.58 |
| 2 | NTWP/MAX-LB | 1012.25 (8.38) | 9.8125 (26.64) | 17.50 |
| 3 | NTWP/MIN-RR | 1088.75 (1.46) | 9.2500 (30.84) | 16.15 |
| 4 | NTWP/MAX-NTWP | 1053.75 (4.63) | 9.6875 (27.57) | 16.09 |
| 5 | NTWP/MAX-RR | 1091.80 (1.18) | 9.2667 (30.72) | 15.95 |
| 6 | NTWP/MIN-LB | 1027.44 (7.01) | 10.2500 (23.36) | 15.18 |
| 7 | NTWP/MAX-MNT | 1058.84 (4.17) | 9.9375 (25.70) | 14.93 |
| 8 | MNT/MAX-LB | 958.56 (13.24) | 11.2500 (15.89) | 14.56 |
| 9 | RR/MAX-LB | 958.56 (13.24) | 11.2500 (15.89) | 14.56 |
| 10 | RR/MAX-NTWP | 991.75 (10.24) | 11.0625 (17.29) | 13.76 |
| ... | | | | |
| 32 | RR/MIN-RR | 1104.88 (0.00) | 12.9414 (3.24) | 1.6217 |

FIG. 10

TASK SCHEDULING METHOD FOR PRIORITY-BASED REAL-TIME OPERATING SYSTEM IN MULTICORE ENVIRONMENT

CROSS REFERENCE TO RELATED APPLICATION

This application claims the benefit of Korean Patent Application No. 10-2013-0122057 filed on Oct. 14, 2013, which is hereby incorporated by reference in its entirety into this application.

BACKGROUND OF THE INVENTION

1. Technical Field

The present invention relates generally to a task scheduling method for a priority-based real-time operating system in a multicore environment and, more particularly, to a method that efficiently schedules tasks in a priority-based Real-Time Operating System (RTOS) installed in a multicore system.

2. Description of the Related Art

Recently, there has been an increase in the number of cases where a multi-core structure is adopted to improve performance relative to power consumption, even in the embedded industry. The use of a multicore structure in an embedded system not only reduces the size of a chip, but also decreases weight and power consumption relative to performance, and thus greatly improves the performance of applications.

However, the use of a multicore structure does not always mean that performance is improved. In some cases, due to low parallelism of an application program, performance may be deteriorated compared to the use of a single core. In order to desirably use a multicore structure, a developer must consider the structure of an application, the partitioning of tasks, the scheduling of tasks, etc. Among these considerations, a task scheduling method is the means contributing most effectively to the improvement of performance.

Conventional real-time multicore task scheduling schemes include a global scheme and a partitioned scheme. As shown in FIG. 1A, the global scheme is configured such that only a single scheduler is present and controls scheduling events of all core processors. In contrast, as shown in FIG. 1B, the partitioned scheme is configured to determine in advance which cores are to be used to execute tasks, partition the tasks, and execute the tasks in the local schedulers of the respective cores.

However, in the Real-Time Operating System (RTOS), there are many cases where tasks are dynamically executed, and thus the above-described conventional real-time multi-core task scheduling schemes (global scheme and partitioned scheme) deteriorate efficiency.

Accordingly, for efficiency, a decentralized scheme shown in FIG. 2A or a fully decentralized scheme shown in FIG. 2B is more suitable. This scheme is similar in shape to the partitioned scheme, but has one more scheduling queue. The decentralized or fully decentralized scheme has a hierarchical structure of L1 and L2 levels, wherein L1 functions to distribute tasks and L2 is a single core dedicated local scheduler present in each core.

The global scheme is advantageous in that it is simple and intuitive, but is disadvantageous in that all scheduling events are concentrated on a single scheduler, so that as the number of cores increases, the scheduling overhead increases. Therefore, in the global scheme, once a task is assigned to a core, preemption is made impossible in some cases. This deteriorates real-time properties, thus resulting in problems.

The decentralized scheme has a structure that is extensible even if the number of cores increases, and allows the scheduling overhead to be distributed. However, in this case, when it is considered that most commercial RTOSs use fixed priority policies, there occurs a problem (priority inversion) in which the priority of tasks may be inverted when tasks are assigned to cores. The problem of priority inversion means that a task having lower priority is executed even if a task having higher priority is present in another core. Of course, in a multicore system, there are many cases where, even if some tasks are accidentally executed with the priorities thereof inverted, the performance thereof only slightly decreases, and a serious problem does not occur. However, the frequent occurrence of priority inversion is not so preferable.

As related preceding technology, Korean Patent Application Publication No. 10-2007-0037427 (entitled "Scheduling in a multicore structure") discloses technology for solving problems that may occur in scheduling used to assign threads in multicore structures.

As another related preceding technology, Korean Patent Application Publication No. 10-2013-0059300 (entitled "Scheduling for supporting real-time properties and Quality of Service (QoS) in a Multicore system") discloses technology for supporting not only QoS requirements, but also real-time properties in a multicore system.

As further related preceding technology, Korean Patent Application Publication No. 10-2013-0074401 (entitled "Multicore-based computing apparatus having a hierarchical scheduler, and a hierarchical scheduling method therefor") discloses technology for reducing an unnecessary cache miss and providing a hierarchical scheduling technique optimized for a multicore system.

As yet another related preceding technology, Korean Patent Application Publication No. 10-2013-0088513 (entitled "Task distribution method and apparatus for a multicore system") discloses technology for incorporating the characteristics of real-time tasks into a system, distributing real-time tasks and non-real-time tasks to the cores of the system, and dynamically solving an imbalance occurring during the execution of tasks.

SUMMARY OF THE INVENTION

Accordingly, the present invention has been made keeping in mind the above problems occurring in the prior art, and an object of the present invention is to provide a method that solves problems occurring in real-time multicore task scheduling which employs a conventional decentralized scheme.

In accordance with an aspect of the present invention to accomplish the above object, there is provided a task scheduling method for a priority-based real-time operating system in a multicore environment, including combining one or more scheduling algorithm candidates for sequential tasks with one or more scheduling algorithm candidates for parallel tasks; simulating respective task scheduling algorithm candidates generated at combining, and evaluating performances of the task scheduling algorithm candidates based on performance evaluation criteria; and selecting a task scheduling algorithm exhibiting best performance from among results obtained at evaluating the performances.

The performance evaluation criteria may include an execution time required until execution of a last subtask of an application is completed, and a number of cases where a task having lower priority is executed even if a task having higher priority is waiting in another core.

Selecting the task scheduling algorithm may be configured to select a task scheduling algorithm candidate having a highest value of average values as the task scheduling algorithm exhibiting best performance, wherein the average values are obtained by averaging a sum of percentages of execution times required until the execution of the last subtask of the application is completed and percentages of the number of cases where a task having lower priority is executed even if a task having higher priority is waiting in another core, based on results of the simulation of respective task scheduling algorithm candidates.

The simulation at evaluating the performances may be configured to perform simulation by applying each of the task scheduling algorithm candidates, generated at combining, to a multicore real-time operating system application program, and requirements of the multicore real-time operating system application program may include a requirement that sequential tasks and parallel tasks need to be present in an application, a requirement that the sequential tasks need to have tasks repeatedly executed with periodicity, a requirement that the sequential tasks and the parallel tasks need to have dependency, and a requirement that all tasks need to have priorities and sizes.

The multicore real-time operating system application program may be an application program adopting a decentralized scheme having a hierarchical structure.

The one or more scheduling algorithm candidates for the sequential tasks may include Round Robin (RR), Minimum Number of Tasks (MNT), Load Balance (LB), and Number of Tasks, Waiting Time and Priority (NTWP) algorithms.

The one or more scheduling algorithm candidates for the parallel tasks may include Minimum (MIN)-RR, MIN-MNT, MIN-LB, MIN-NTWP, Maximum (MAX)-RR, MAX-MNT, MAX-LB, and MAX-NTWP algorithms.

The task scheduling algorithm candidates generated at combining may include RR/MIN-RR, RR/MIN-MNT, RR/MIN-LB, RR/MIN-NTWP, RR/MAX-RR, RR/MAX-MNT, RR/MAX-LB, RR/MAX-NTWP, MNT/MIN-RR, MNT/MIN-MNT, MNT/MIN-LB, MNT/MIN-NTWP, MNT/MAX-RR, MNT/MAX-MNT, MNT/MAX-LB, MNT/MAX-NTWP, LB/MIN-RR, LB/MIN-MNT, LB/MIN-LB, LB/MIN-NTWP, LB/MAX-RR, LB/MAX-MNT, LB/MAX-LB, LB/MAX-NTWP, NTWP/MIN-RR, NTWP/MIN-MNT, NTWP/MIN-LB, NTWP/MIN-NTWP, NTWP/MAX-RR, NTWP/MAX-MNT, NTWP/MAX-LB, and NTWP/MAX-NTWP algorithms.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing an example to which a sequential task scheduling algorithm is applied;

FIG. 7 is a diagram illustrating the details of respective tasks shown in FIG. 6;

FIG. 8 is a diagram illustrating the entire multicore task scheduling algorithm;

FIG. 10 is a diagram illustrating the results of evaluation simulation.

DESCRIPTION OF THE PREFERRED EMBODIMENTS

Figure 1A:
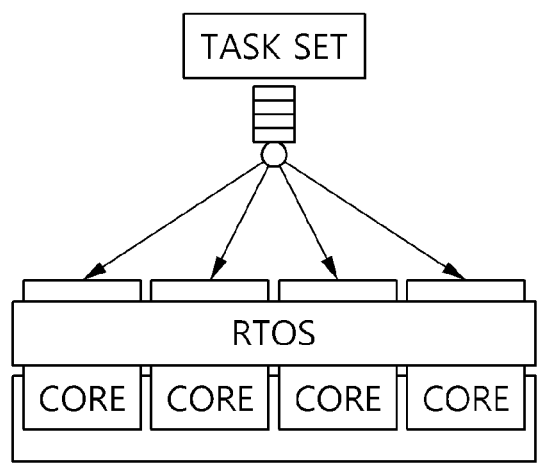
FIGS. 1A and 1B are diagrams showing task scheduling in a conventional global scheme and partitioned scheme.
Figure 1B:
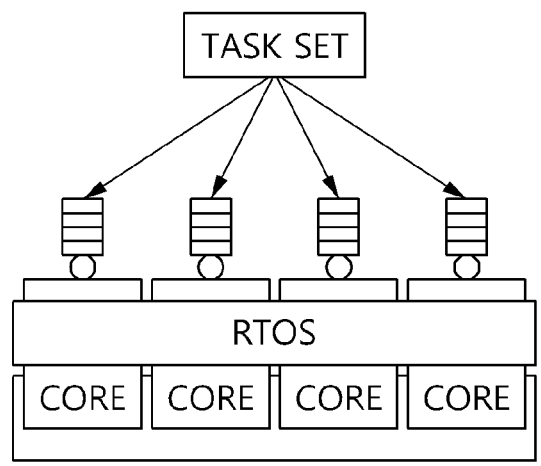

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Prior to the description of the present invention, basic assumptions and matters to be previously noted in the present invention will be summarized and described below.

A task scheduling method greatly differs according to the system environment and basic assumption. Therefore, differences between a scheduling method used in a conventional multicore (or multiprocessor) system and the scheduling method according to the present invention will be briefly described, as shown in the following Table 1.

TABLE 1

|  | Real-time task Scheduling | Parallel task Scheduling | RTOS task scheduling |
|---|---|---|---|
| Representative algorithm | Global fixed Priority (G-FP), Partitioned-FP (P-FP), Global Earliest-Deadline-First (G-EDF), Partitioned-EDF (P-EDF), Rate Monotonic Next Fit (RMNF), EDF-NF, Pfair | MIN-MIN, MAX-MIN, Sufferage, XSufferage | The present invention |
| Purpose | Meet deadline | Shorten final completion time | Maintain priority and shorten final completion time |
| Task type | Periodic task | Parallel task | Sequential, parallel task |

TABLE 1-continued

| | Real-time task Scheduling | Parallel task Scheduling | RTOS task scheduling |
|---|---|---|---|
| Required input Application fields | Deadline, period, execution time Soft/hard real-time computing | Execution time High-performance computing | Priority, execution time Real-time and high-performance computing |

A problem desired to be solved in the present invention belongs to an RTOS task scheduling problem, as shown in Table 1. In this problem, the tasks of the RTOS have fixed priority, as adopted by a conventional commercial RTOS. Further, tasks have corresponding sizes (execution times), and are divided into sequential tasks and parallel tasks.

Meanwhile, a multicore system S to which the present invention is applied is composed of m core processors and is defined as $S=\{C_i | i=1, \ldots m\}$, where $C_i$ denotes an i-th core in S.

A multicore application A is composed of n tasks and is defined as $A=\{T_i | i=1, \ldots, n\}$, where $T_i$ denotes an i-th task in A. Each task has fixed priority 'prior($T_i$)'.

In this case, tasks $T_i$ may be classified into sequential tasks (SEQ tasks) and parallel tasks (High Performance Computing: HPC tasks).

Sequential tasks refer to tasks aimed at being executed as fast as possible depending on given priorities.

Parallel (HPC) tasks are each composed of a plurality of low-level (subtasks), and HPC task $T_k$ is defined as $T_k = U\{t_i^k | i=1, \ldots, r\}$, where $t_i^k$ denotes an i-th subtask in $T_k$. In this case, subtasks inherit the priority of the HPC task itself as default.

Further, the expected execution time of the task $T_i$ is represented by $\tau(T_i)$, which denotes the remaining amount of work of the corresponding task at the present time and is identical for all cores.

Furthermore, the expected start time of the task $T_i$ in a specific core $C_j$ is represented by $EST(T_i, C_j)$. The value of $EST(T_i, C_j)$ denotes the total expected time required to wait until the task $T_i$ is actually executed in the core $C_j$ after entering a scheduling queue. This time may be calculated as the sum of the expected execution times of tasks having priority equal to or higher than that of the task $T_i$.

In the above-described multicore system, the term "task scheduling" denotes the problem of determining to which core each task is to be assigned. The present invention assumes an extensible decentralized scheme, such as those shown in FIGS. 2A and 2B. The present invention places emphasis on the following two cases so as to efficiently schedule tasks in a priority-based Real-Time Operating System (RTOS) installed in the multicore system.

1) Minimization of Task Priority Inversion in Multicore Environment

A phenomenon in which a current task is executed even if another task having higher priority is waiting in another core is called 'priority inversion.' In the priority-based RTOS, the real-time properties of applications may be improved only when such priority inversion is minimized.

2) Task Load Equalization for High Performance

High performance may be obtained only when the loads of tasks are decentralized. A criterion for decentralizing loads may be represented by makespan (final completion time of a parallel application program). The loads of tasks may be equalized only when makespan is minimized.

Therefore, if scheduling basically satisfies these two considerations, it may be regarded as desirable scheduling.

However, in the case of a decentralized structure, a scheduler is hierarchically configured, and a second level (L2) scheduler only needs to use an existing single core scheduler without change (for reference, in the conventional RTOS, a scheduler that is the most widely used as a single core scheduler is a preemptive round-robin scheduler). Therefore, a first level (L1) scheduler only needs to be desirably designed so that the two considerations can be desirably satisfied. The function of the L1 scheduler is to distribute tasks to cores.

Hereinafter, embodiments of the present invention will be described in detail with reference to the attached drawings.

Figure 3:
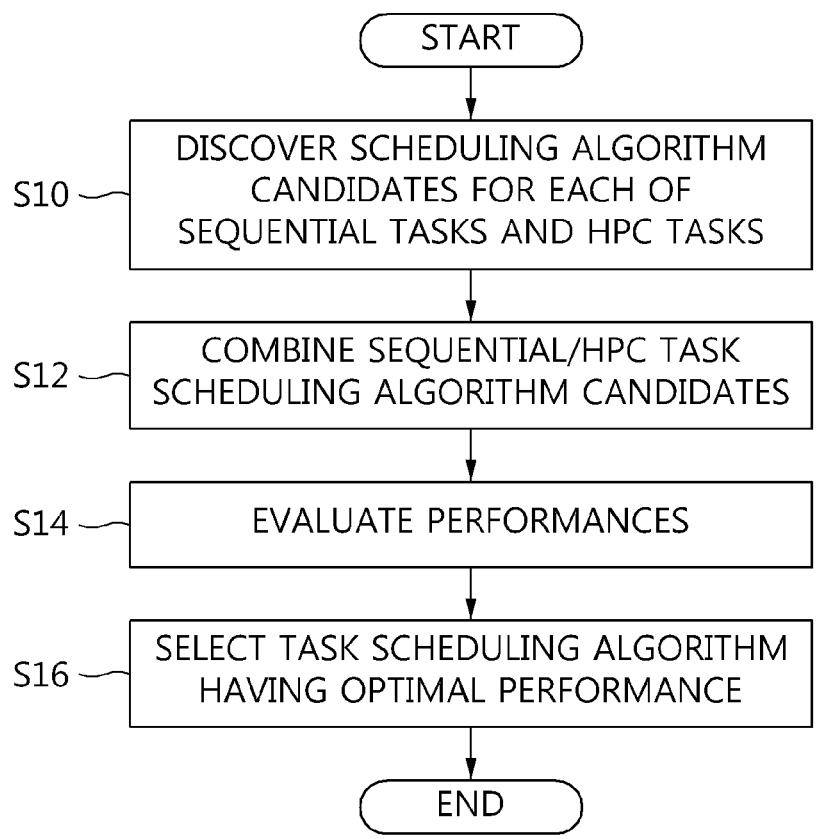
FIG. 3 is a flowchart showing a task scheduling method for a priority-based Real-Time Operating System (RTOS) in a multicore environment according to an embodiment of the present invention.
Figure 5A:
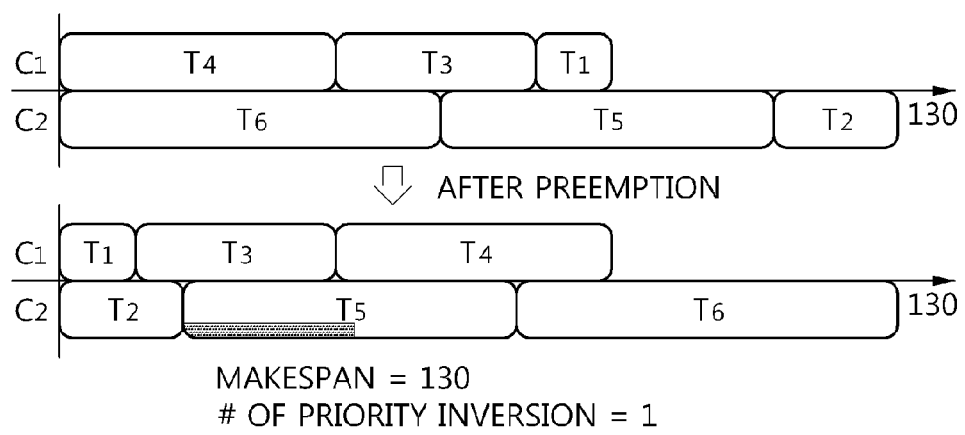
FIGS. 5A to 5C are diagrams showing the results of application of the sequential task scheduling algorithm.
Figure 5B:
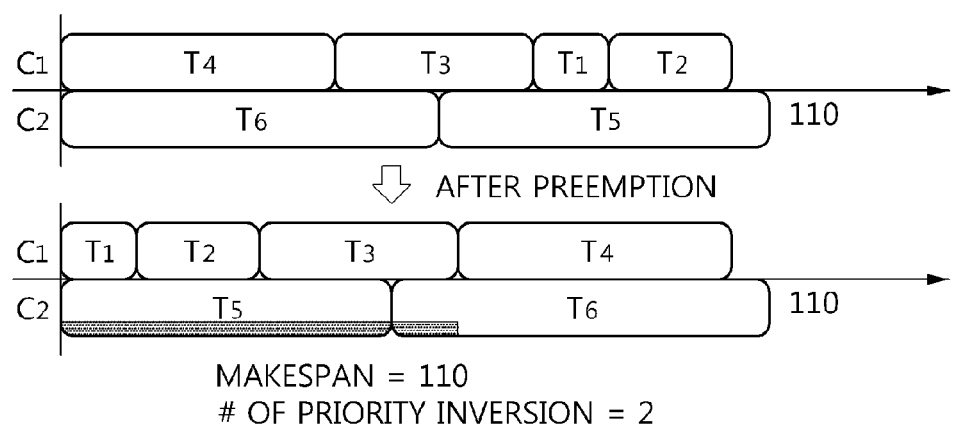
Figure 5C:
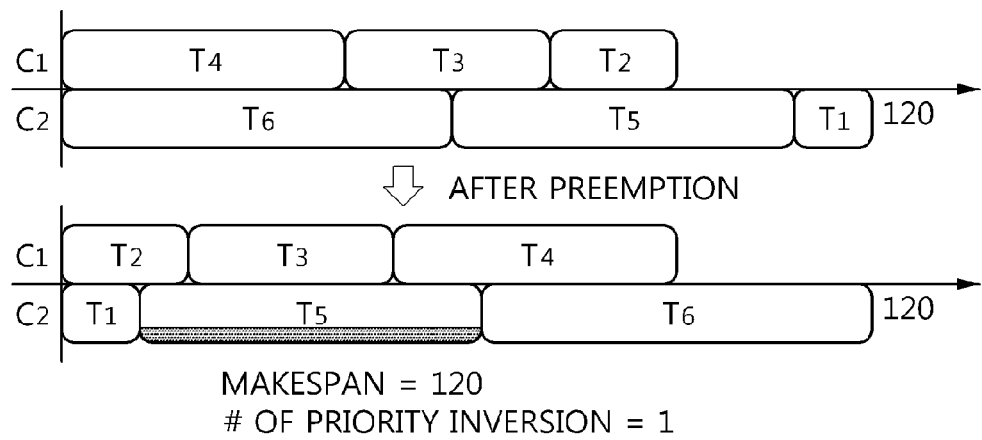
Figure 6:
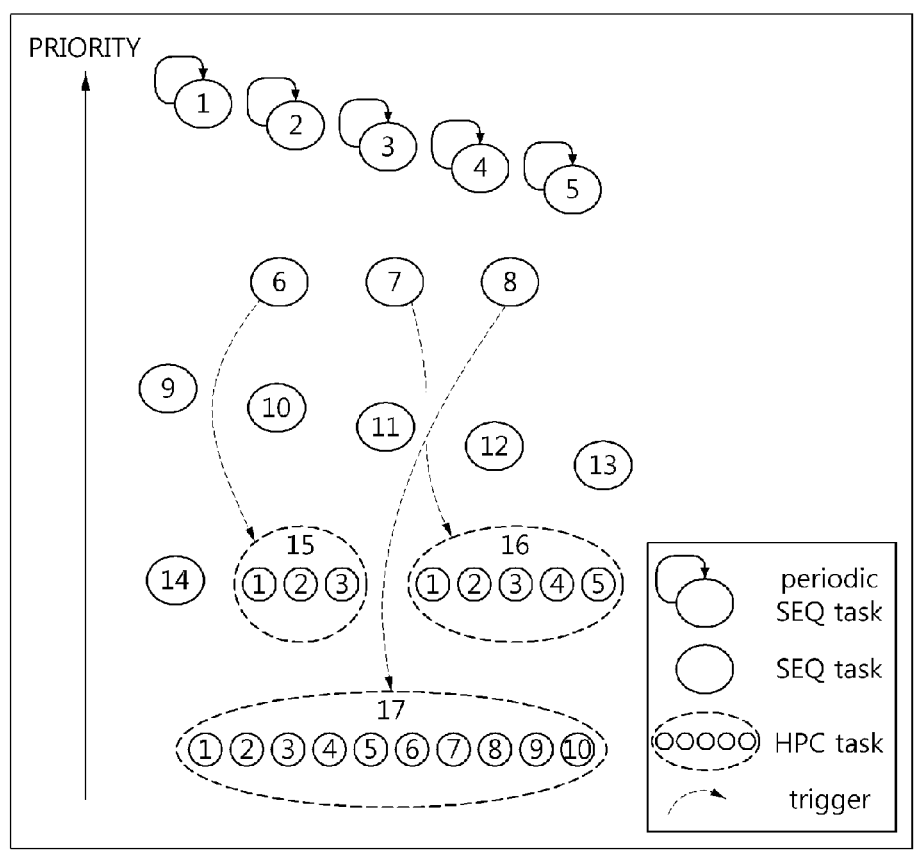
FIG. 6 is a diagram showing an example of an RTOS multicore application.
Figure 9:
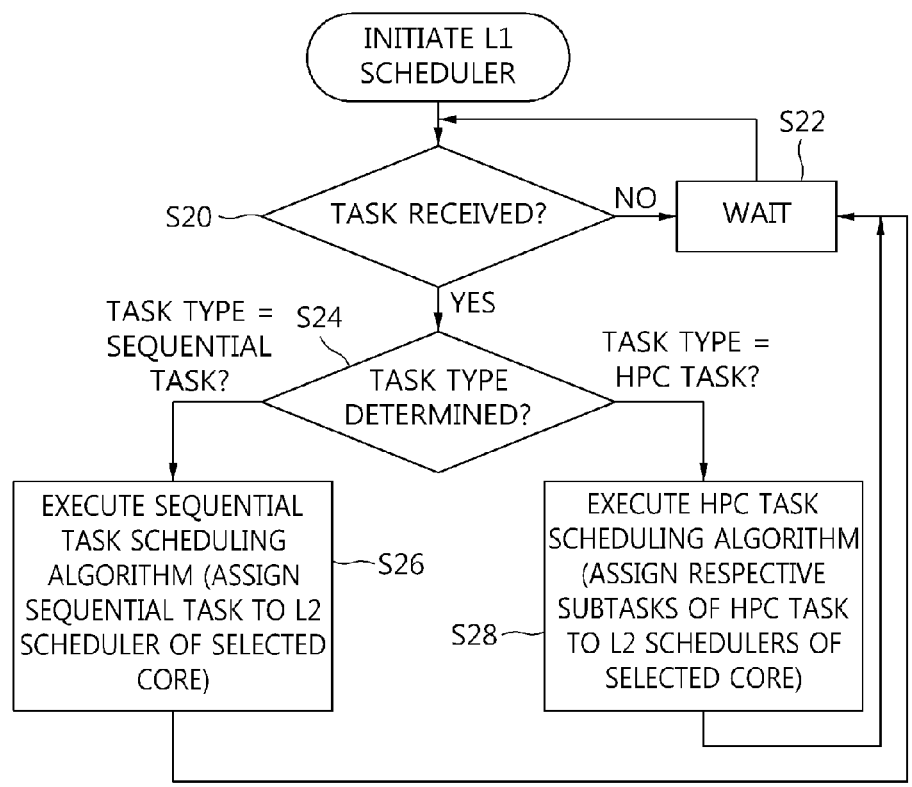
FIG. 9 is a flowchart showing the entire multicore task scheduling algorithm.

FIG. 3 is a flowchart showing a task scheduling method for a priority-based Real-Time Operating System (RTOS) in a multicore environment according to an embodiment of the present invention, FIG. 4 is a diagram showing an example to which a sequential task scheduling algorithm is applied, FIGS. 5A to 5C are diagrams showing the results of application of the sequential task scheduling algorithm, FIG. 6 is a diagram showing an example of an RTOS multicore application, FIG. 7 is a diagram illustrating the details of respective tasks shown in FIG. 6, FIG. 8 is a diagram illustrating the entire multicore task scheduling algorithm, FIG. 9 is a flowchart showing the entire multicore task scheduling algorithm, and FIG. 10 is a diagram illustrating the results of evaluation simulation.

A task scheduling method for a priority-based RTOS in a multicore environment according to an embodiment of the present invention includes the step S10 of discovering scheduling algorithm candidates for each of sequential tasks and parallel (HPC) tasks, the step S12 of combining the scheduling algorithm candidates for the sequential tasks and the HPC tasks, the step S14 of evaluating the performances of the scheduling algorithm candidates based on the entire multicore task scheduling algorithm, and the step S16 of selecting a task scheduling algorithm having the optimal performance.

First, at step S10, scheduling algorithm candidates for each of sequential tasks and HPC tasks are discovered (selected). The scheduling algorithm candidates for each of sequential tasks and HPC tasks may be discovered (selected) by a user. For example, one or more scheduling algorithm candidates for sequential tasks and one or more scheduling algorithm candidates for HPC tasks, which are previously stored (or defined) in memory or the like, may be used by the user.

Here, the scheduling algorithm candidates for sequential tasks will be described below. Sequential tasks need only be executed as fast as possible depending on given priorities. Expectable task waiting time is related to $EST(T_i, C_j)$. The sequential task scheduling algorithm candidates applied to the embodiment of the present invention may include Round Robin (RR), Minimum Number of Tasks (MNT), Load Balance (LB), and Number of Tasks, Waiting Time and Priority (NTWP) algorithms among various task scheduling algorithms.

The Round Robin (RR) algorithm is an algorithm for sequentially distributing tasks to cores immediately when the tasks arrive and has the advantage of being very simple. This algorithm may be used for reference and comparison with other algorithms.

In the case of the Minimum Number of Tasks (MNT) algorithm, the number of tasks assigned to each core becomes good information required to realize the load equalization of tasks. This algorithm assigns tasks to a core to which a minimum number of tasks are assigned.

The Load Balance (LB) algorithm is an algorithm in which only the sum of execution times of tasks assigned to each core is taken into consideration. This algorithm assigns tasks to a core, in which the sum of task execution times is the smallest.

The Number of Tasks, Waiting Time and Priority (NTWP) algorithm is an algorithm for selecting a core having tasks, the waiting time of which is the shortest, from among cores having the same number of tasks if there are multiple cores having the same number of tasks after the MNT algorithm has been taken into consideration. If there are multiple cores having the same task waiting time, a core having a task set, for which the sum of task priority values is the smallest, is selected. This algorithm is a hybrid scheme which considers all of the number of tasks, waiting time, and priority.

A simple example to which sequential task scheduling algorithm candidates are applied is shown in FIG. 4. In the example of FIG. 4, it is assumed that two cores are present. When a task arrives at the L2 scheduler, a preemption policy is applied according to the task priority, and then tasks are rearranged. FIG. 5A illustrates a case where the RR or MNT algorithm is applied. According to the example presented in FIG. 4, the RR or the MNT algorithm generates the same schedule, as shown in FIG. 5A. Therefore, although it is difficult to know a difference between the RR and MNT algorithms, the MNT algorithm desirably reflects a current load state in a more dynamic environment, and is then able to make better schedules than the RR algorithm. FIG. 5B illustrates a case where the LB algorithm is applied. Referring to FIG. 5B, the LB algorithm allows loads to be desirably balanced by minimizing makespans. FIG. 5C illustrates a case where the NTWP algorithm is applied. Referring to FIG. 5C, it can be seen that the NTWP algorithm increases the occurrence of load imbalance, but decreases the occurrence of priority inversion, compared to the LB algorithm.

Below, the HPC task scheduling algorithm candidates will be described. Scheduling HPC tasks is to schedule all subtasks of each HPC task. As an algorithm for reducing the final completion time (makespan) of the HPC task upon scheduling subtasks, there are famous algorithms such as MIN-MIN and MAX-MIN algorithms. The MIN-MIN algorithm is configured to arrange tasks in ascending order of task size, and assign first a task having a minimum size in such a way that the minimum-size task is assigned to a core which has completed its own tasks first. The MAX-MIN algorithm is configured to arrange tasks in descending order of task size, and assign first a task having a maximum size so that the maximum-size task is assigned to a core which has completed its own tasks first.

The present invention applies the MIN-MIN algorithm and the MAX-MIN algorithm to each of the above-described sequential task scheduling algorithms, and then presents HPC task scheduling candidates. For example, a MIN-RR algorithm is a HPC task scheduling scheme for selecting first a task having a minimum size and assigning the task to a core in a round-robin manner. In this way, there are a total of eight types of HPC task scheduling algorithm candidates, such as MIN-(.) and MAX-(.)(where (.) is a sequential task scheduling algorithm). That is, in the embodiment of the present invention, the HPC task scheduling algorithm candidates are MIN-RR, MIN-MNT, MIN-LB, MIN-NTWP, MAX-RR, MAX-MNT, MAX-LB, and MAX-NTWP algorithms.

At step S12, after the sequential task scheduling algorithm candidates and the HPC task scheduling algorithm candidates, which are required in the embodiment of the present invention, have been selected (discovered), the sequential task scheduling algorithm candidates and the HPC task scheduling algorithm candidates are combined. Task scheduling algorithm candidates generated via combination become a total of 32 algorithms (that is, RR/MIN-RR, RR/MIN-MNT, RR/MIN-LB, RR/MIN-NTWP, RR/MAX-RR, RR/MAX-MNT, RR/MAX-LB, RR/MAX-NTWP, MNT/MIN-RR, MNT/MIN-MNT, MNT/MIN-LB, MNT/MIN-NTWP, MNT/MAX-RR, MNT/MAX-MNT, MNT/MAX-LB, MNT/MAX-NTWP, LB/MIN-RR, LB/MIN-MNT, LB/MIN-LB, LB/MIN-NTWP, LB/MAX-RR, LB/MAX-MNT, LB/MAX-LB, LB/MAX-NTWP, NTWP/MIN-RR, NTWP/MIN-MNT, NTWP/MIN-LB, NTWP/MIN-NTWP, NTWP/MAX-RR, NTWP/MAX-MNT, NTWP/MAX-LB, and NTWP/MAX-NTWP algorithms).

Thereafter, at step S14, experiments are performed by applying 32 task scheduling algorithm candidates generated via combination to a multicore RTOS application program, and the performances of the algorithm candidates are evaluated. Requirements of the multicore RTOS application program for experiments are given as follows. A first requirement is that sequential tasks and HPC tasks should be present in an application. A second requirement is that the sequential tasks should have tasks that are repeatedly executed with periodicity. A third requirement is that the sequential tasks and the HPC tasks should have dependency. A fourth requirement is that all tasks should have priorities and sizes (execution times).

An example of a multicore application meeting such requirements is illustrated in FIG. 6. FIG. 7 illustrates an example which describes details of respective tasks shown in FIG. 6.

Meanwhile, the algorithm of a multicore RTOS application program (that is, the entire multicore scheduling algorithm) for experiments may be illustrated, as shown in FIG. 8. In FIG. 8, a sequential task scheduling algorithm becomes CoreSelectSEQ($T_i$). A HPC task scheduling algorithm is CoreSelectHPC($T_i$), which may be regarded as utilizing the CoreSelectSEQ($T_i$). An L1_Scheduler ($T_i$) illustrated in FIG. 8 may differ depending on which algorithms are to be used by CoreSelectSEQ($T_i$) and CoreSelectHPC($T_i$). Combinations of sequential task/HPC task algorithms are 32 types of candidates. For this, in the present invention, those combinations will be represented by a form such as RR/MIN-MNT. Here, RR denotes CoreSelectSEQ($T_i$), and MIN-MNT denotes CoreSelectHPC($T_i$). In the case of MNT/MAX-NTWP, MNT becomes CoreSelectSEQ($T_i$), and MAX-NTWP becomes CoreSelectHPC($T_i$).

Figure 2A:
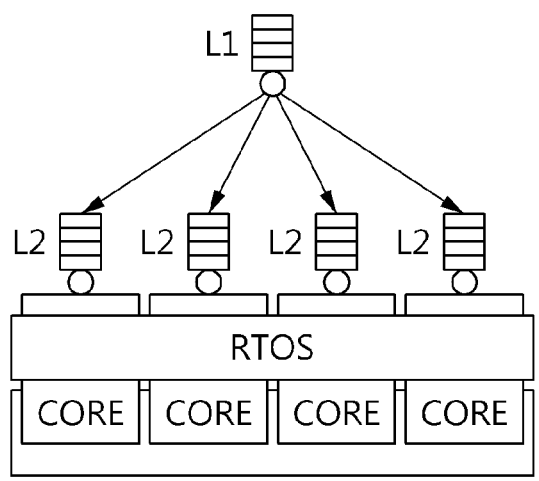
FIGS. 2A and 2B are diagrams showing task scheduling in a decentralized scheme.
Figure 2B:
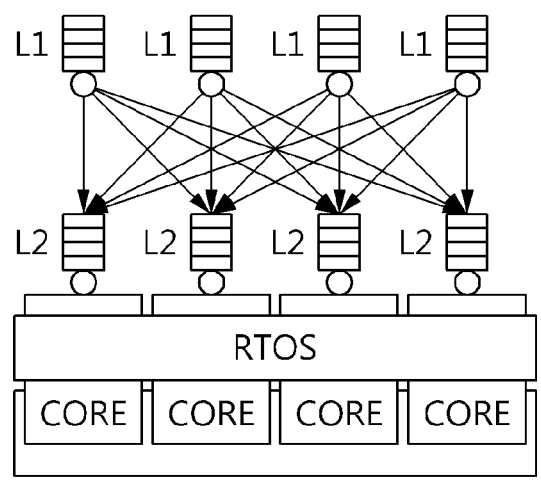

FIG. 9 illustrates the algorithm of FIG. 8 in the form of a flowchart. The reason for presenting only an L1 scheduler algorithm is that, as described above, a decentralized multicore scheduling method only needs to use an existing single core scheduling algorithm (priority-based scheduling algorithm) as an L2 scheduler algorithm without change. Therefore, only the algorithms of L1 shown in FIGS. 2A and 2B are presented. In the present invention, it is assumed that the L2 scheduling algorithm is a priority-based scheduling algorithm that is frequently used in an RTOS for a single core.

Referring to the flowchart of FIG. 9, when the L1 scheduler is initiated, it first receives a task $T_i$ at step S20. If a task $T_i$ is not yet received, the L1 scheduler continuously waits at step S22. If the task $T_i$ is received, the L1 scheduler determines the type of received task $T_i$ at step S24. If the type of task $T_i$ is a sequential task, the L1 scheduler executes a sequential task scheduling algorithm at step S26, whereas if the type of task $T_i$ is a parallel (HPC) task, the L1 scheduler executes an HPC task scheduling algorithm at step S28. In this case, the execution of the sequential task scheduling algorithm means that the sequential task is assigned to the L2 scheduler of a selected core, and the execution of the HPC task scheduling algorithm means that respective subtasks of the HPC task are assigned to the L2 schedulers of a selected core.

In this way, the performances of algorithms are evaluated by applying each of the 32 task scheduling algorithm candidates to the algorithm of FIG. 8. Here, performance evaluation criteria required to respectively evaluate the 32 task scheduling algorithm candidates are to minimize makespan and priority inversion depending on the purpose of a task scheduling problem, as described above. Therefore, in order to evaluate performances, two types of evaluation indices (makespan and priority inversion: prioinv) may be used. Here, the term 'makespan' denotes the execution time (final completion time) required until the last subtask of an application is completed. The term 'prioinv' (priority inversion) denotes the number of cases where a task having lower priority is executed even if a task having higher priority is waiting in another core. For example, an ARM-Cortex A8 processor may simulate individual scheduling algorithm candidates on the multicore RTOS using the application presented in FIG. 7, and may obtain results such as those shown in FIG. 10.

Finally, at step S16, a task scheduling algorithm having the optimal performance is selected. In an embodiment of the present invention, among average values obtained by averaging the sum of percentages of execution times makespan required until the execution of the last subtask of the application is completed and the percentages of the number of cases prionv where a task having lower priority is executed even if a task having higher priority is waiting in another core as a result of the simulation of respective task scheduling algorithm candidates, a task scheduling algorithm candidate having the highest average value is selected as a task scheduling algorithm having optimal performance. That is, in FIG. 10, the ranks of respective candidates are shown based on makespan and prioinv values. As a result, it can be seen from the resulting table that a NTWP/MIN-MNT algorithm combination exhibits the best performance from the standpoint of makespan and priority inversion. A NTWP/MIN-MNT algorithm combination exhibits 4.08% improvement from the standpoint of makespan and 30.37% improvement from the standpoint of prioinv, compared to RR/MIN-RR exhibiting the worst performance.

The operation at step S12 of FIG. 3 may be performed by a combination unit (or combination device), the operation at step S14 may be performed by a performance evaluation unit (or a performance evaluation device), and the operation at step S16 may be performed by a selection unit (or selection device). Although not shown in detail in a separate drawing, anyone will easily understand that, in order to practice the present invention, an apparatus including a combination unit capable of performing the operation at step S12, a performance evaluation unit capable of performing the operation at step S14, and a selection unit capable of performing the operation at step S16 must be provided, from the above description. Meanwhile, the operation of combining sequential task scheduling algorithm candidates with HPC task scheduling algorithm candidates at step S12 may also be performed by the user as occasion demands.

In accordance with the present invention having the above configuration, a scheduling algorithm capable of performing high-performance, real-time, and efficient task scheduling can be selected or created in a multicore RTOS, with the result that a multicore system can be desirably utilized and can contribute to the further improvement of the performance of embedded applications.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A task scheduling method for a priority-based real-time operating system in a multicore environment, comprising:
   combining, using a processor, one or more scheduling algorithm candidates for sequential tasks with one or more scheduling algorithm candidates for parallel tasks;
   simulating, using the processor, respective task scheduling algorithm candidates generated at the combining, and evaluating performances of the simulated task scheduling algorithm candidates based on performance evaluation criteria; and
   selecting, using the processor, a task scheduling algorithm exhibiting best performance from among results obtained from the evaluating of performances.

2. The task scheduling method of claim 1, wherein the performance evaluation criteria include an execution time required until execution of a last subtask of an application is completed, and a number of cases where a task having lower priority is executed even if a task having higher priority is waiting in another core.

3. The task scheduling method of claim 2, wherein the selecting the task scheduling algorithm is configured to select a task scheduling algorithm candidate having a highest value of average values as the task scheduling algorithm exhibiting best performance, wherein the average values are obtained by averaging a sum of percentages of execution times required until the execution of the last subtask of the application is completed and percentages of the number of cases where a task having lower priority is executed even if a task having higher priority is waiting in another core, based on results of the simulation of respective task scheduling algorithm candidates.

4. The task scheduling method of claim 1, wherein:
   the simulation at evaluating the performances is configured to perform simulation by applying each of the task scheduling algorithm candidates, generated at combining, to a multicore real-time operating system application program,
   requirements of the multicore real-time operating system application program include a requirement that sequential tasks and parallel tasks need to be present in an application, a requirement that the sequential tasks need to have tasks repeatedly executed with periodicity, a requirement that the sequential tasks and the parallel tasks need to have dependency, and a requirement that all tasks need to have priorities and sizes.

5. The task scheduling method of claim 4, wherein the multicore real-time operating system application program is an application program adopting a decentralized scheme having a hierarchical structure.

6. The task scheduling method of claim 1, wherein the one or more scheduling algorithm candidates for the sequential tasks include Round Robin (RR), Minimum Number of Tasks (MNT), Load Balance (LB), and Number of Tasks, Waiting Time and Priority (NTWP) algorithms.

7. The task scheduling method of claim 1, wherein the one or more scheduling algorithm candidates for the parallel tasks include Minimum (MIN)-RR, MIN-MNT, MIN-LB, MIN-NTWP, Maximum (MAX)-RR, MAX-MNT, MAX-LB, and MAX-NTWP algorithms.

8. The task scheduling method of claim 1, wherein the task scheduling algorithm candidates generated at combining include RR/MIN-RR, RR/MIN-MNT, RR/MIN-LB, RR/MIN-NTWP, RR/MAX-RR, RR/MAX-MNT, RR/MAX-LB, RR/MAX-NTWP, MNT/MIN-RR, MNT/MIN-MNT, MNT/MIN-LB, MNT/MIN-NTWP, MNT/MAX-RR, MNT/MAX-MNT, MNT/MAX-LB, MNT/MAX-NTWP, LB/MIN-RR, LB/MIN-MNT, LB/MIN-LB, LB/MIN-NTWP, LB/MAX-RR, LB/MAX-MNT, LB/MAX-LB, LB/MAX-NTWP, NTWP/MIN-RR, NTWP/MIN-MNT, NTWP/MIN-LB, NTWP/MIN-NTWP, NTWP/MAX-RR, NTWP/MAX-MNT, NTWP/MAX-LB, and NTWP/MAX-NTWP algorithms.

* * * * *